United States Patent [19]

Steinwart et al.

[11] 4,180,038

[45] Dec. 25, 1979

[54] FUEL INJECTION SYSTEM FOR AN INTERNAL COMBUSTION ENGINE

[75] Inventors: Johannes Steinwart, Obersulm-Willsbach; Gerhard Maurhoff; Armin Bauder, both of Neckarsulm; Gottlieb Wilmers, Neuenstadt; Reiner Pischke, Jagstfeld, all of Fed. Rep. of Germany

[73] Assignee: Audi Nsu Auto Union Aktiengesellschaft, Fed. Rep. of Germany

[21] Appl. No.: 872,948

[22] Filed: Jan. 27, 1978

[30] Foreign Application Priority Data

Jan. 29, 1977 [DE] Fed. Rep. of Germany ....... 2703722

[51] Int. Cl.$^2$ ...................... F02M 39/00; B01D 47/00

[52] U.S. Cl. ......................... 123/139 AW; 261/44 A; 261/50 A

[58] Field of Search ............. 123/139 AW; 261/44 R, 261/44 A, 50 R, 50 A

[56] References Cited

U.S. PATENT DOCUMENTS

| | | | |
|---|---|---|---|
| 3,972,314 | 8/1976 | Dupont et al. | 123/139 AW |
| 4,105,000 | 8/1978 | Wessel et al. | 123/139 AW |
| 4,108,128 | 8/1978 | Knapp | 123/139 AW |
| 4,125,102 | 11/1978 | Tanaka et al. | 123/139 AW |

*Primary Examiner*—Charles J. Myhre
*Assistant Examiner*—M. Moy
*Attorney, Agent, or Firm*—Kane, Dalsimer, Kane, Sullivan and Kurucz

[57] ABSTRACT

A fuel injection system for a mixture-compressing internal combustion engine has separate ignition and continuous injection into the engine inlet duct which includes an adjustable throttle butterfly valve and a baffle flap pivoted at the side of the duct under the effect of the flow through the duct acting in opposition to a return force. The flap is coupled to a damper blade, and also to a coaxial rotary control member of a fuel metering valve, the latter comprising a control cylinder and a control piston rotating inside and in relation to the cylinder, and metering a quantity of fuel to one or more injector nozzles in proportion to the air current quantity. The control cylinder being stationary and mounted alongside the baffle flap outside the inlet duct, and the rotary control piston being connected outside the control cylinder adjacent one end to the baffle flap, and adjacent the other end to the damper blade, so as to rotate with the flap and the blade.

13 Claims, 6 Drawing Figures

FUEL INJECTION SYSTEM FOR AN INTERNAL COMBUSTION ENGINE

BACKGROUND OF THE INVENTION

This invention relates to a fuel injection system for a mixture-compressing internal-combustion engine having separate ignition and continuous injection into the engine inlet duct which includes an adjustable throttle butterfly valve and a baffle flap pivoted at the side of the duct under the effect of the flow through the duct acting in opposition to a return force. The flap is coupled to a damper blade, and also to a coaxial rotary control member of a fuel metering valve, the latter comprising a control cylinder and a control piston rotating inside and in relation to the cylinder, and metering a quantity of fuel to one or more injector nozzles in proportion to the air current quantity.

In an existing fuel injection system of this type the metering valve is mounted on the bearing axis of the baffle flap, the control cylinder being coupled to the baffle flap and forming its bearing bush, while the control piston is stationary and acts as a bearing trunnion for the baffle flap. One disadvantage of this arrangement is that the rotary control cylinder makes it possible to connect more than one injection pipe to the metering valve. In addition, the damper blade must be coupled directly to the hub of the baffle flap, so that a damper chamber must be provided to accommodate the damper blade at the side of the intake pipe, thus appreciably increasing the dimensions of the injection equipment.

SUMMARY OF THE INVENTION

Accordingly, it is an object of the invention to provide a fuel injection system of the type described, which is compact in construction, and which allows a number of injection pipes to be connected to the metering valve.

Broadly stated the invention consists of a fuel injection system of the type described in which the control cylinder is mounted on the inlet duct at the side adjacent the baffle flap, and the rotary control piston is coupled outside the control cylinder, one end to the baffle flap, and the other end to the damper blade, so as to turn with both.

Since the control cylinder is stationary and outside the intake pipe it can, by providing the requisite number of individual control ports, be used to supply a number of injector nozzles. The fixing of the baffle flap to one end of the control piston and the damper blade to the other end means that little space is required, since the damper chamber is not to the side of the inlet duct, but can be mounted above or below it as desired.

Preferably a lateral boss is provided on the inlet duct wall near the baffle flap, accomodating one end of the control cylinder, and into which a protrusion of the baffle flap extends, coupled to the end of the control piston so as to turn with it.

The control piston may have peripheral slots, one for each injection nozzle while the control cylinder has control ports cooperating with these slots, and connected by passages in a housing enclosing the control cylinder and secured to it and via conventional constant-pressure valves to the individual nozzles. These constant-pressure valves are preferably flat-seated, with a diaphragm separating two chambers, and a valve seat in one of the chambers controlled by the diaphragm.

Thus due to the arrangement of the stationary control cylinder on the side of the inlet duct it is possible to accomodate these constant-pressure valves in very little space. The housing accomodating the control cylinder conveniently has on the side furthest from the baffle flap a flat face parallel with the axis of rotation of the control piston, and containing one or more recesses each forming the first chamber of a constant-pressure valve, covered by a diaphragm. A component fits onto this flat face and has in its contacting face one or more recesses each forming the second chamber of one of the constant-pressure valves, connected to one of the passages and via the valve seat to an injection nozzle, while the first chamber is supplied with fuel at controlled pressure.

The fuel injection system according to the invention can, by mounting the constant-pressure valves at the side, be used to supply a larger number of injection nozzles without noticeably increasing the dimensions, since the component fitted to the control cylinder housing may have a second flat face on the side furthest from it, with recesses forming the chambers of further constant-pressure valves covered by diaphragms, while a cover with mating recesses forming the second chambers of these extra constant-pressure valves is fitted to this second flat face. This results in practice in the constant-pressure valves being mounted in two planes parallel with each other, and in appreciable space saving as compared with an arrangement in which the constant-pressure valves are arranged concentrically round the metering valve.

Preferably the control cylinder and piston are mounted vertically, with the damper blade at the top end of the control piston in a damper chamber connected to the fuel supply pipe, which is connected to a space above the damper chamber, which in turn is connected both to the lengthwise bore in the control piston and to the second chambers of the constant-pressure valves. By using the fuel as damper fluid, the effect of alterations in viscosity due to temperature fluctuations is reduced to the minimum. By situating the fuel supply at the top of the unit containing the metering and constant pressure valves, any air or vapor bubbles occurring in the fuel are collected in the space referred to. The system pressure regulator valve normally included with such systems is preferably mounted on the damper chamber and connected to this space, so that air or vapor bubbles are led away through the return flow passage of the system pressure regulator valve.

The invention may be performed in several different ways and one particular embodiment with some possible modifications will now be described by way of example with reference to the accompanying drawings.

DETAILED DESCRIPTION OF THE PREFERRED EMBODIMENT

Figure 1:
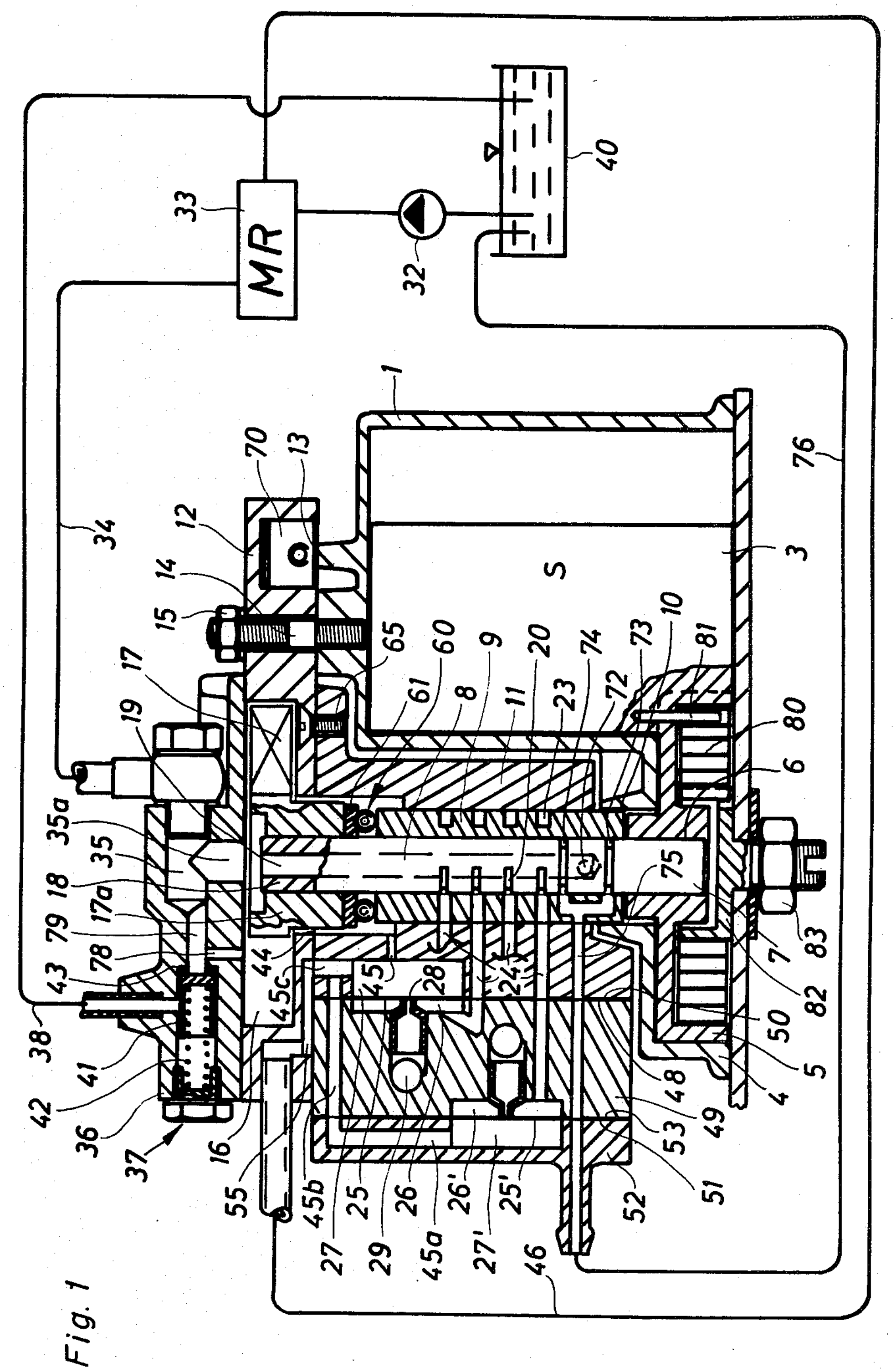
FIG. 1 is a diagrammatic sectional side elevation of a fuel injection system in accordance with the invention, including an air flow sensing device, and fuel metering and constant pressure valves.
Figure 2:
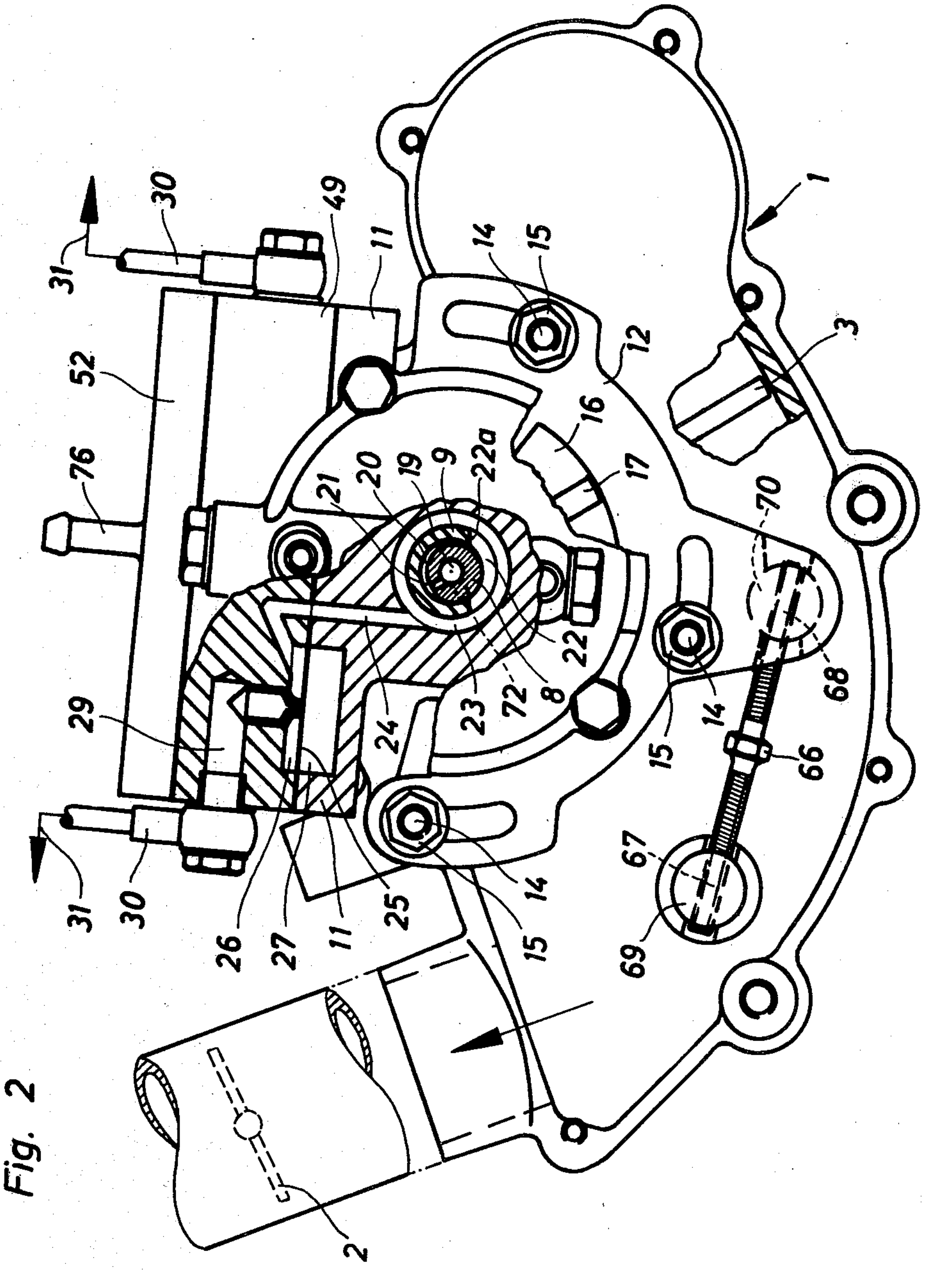
FIG. 2 is a plan view of the unit illustrated in FIG. 1 partly in section.

Referring first to FIGS. 1, and 2, 1 is the inlet duct of a mixture-compressing internal-combustion engine provided with a separate ignition system, and contains a throttle butterfly valve 2 to be operated as desired, and a pivoted baffle flap 3 mounted in bearings at the side of the inlet duct 1. For this purpose the wall of the inlet duct 1 has a lateral boss 4 near the baffle flap 3, into which a projection 5 of the baffle flap 3 extends. The protrusion has a bore 6 accomodating one end 7 of a control piston 8 so that the latter turns with it. The piston forms the moving part of a fuel metering valve, and rotates in a stationary control cylinder 9. The control cylinder 9 is mounted at its lower end in a bore 10 in the wall of the intake pipe boss 4, and fixed for example by making it a press fit, in a valve housing 11 having a cover 12 fitting on an upper flat surface 13 of the inlet duct 1, and secured by bolts 14 and nuts 15 to the duct. The cover 12 has a recess 16 concentric to the axis of rotation of the control piston 8, and in this recess a damper blade 17 is accommodate secured to the upper end 18 of the control piston 8 so as to turn with it.

The control piston 8 has a central lengthwise bore 19, and peripheral slots 20 in its outer surface, the number of slots being the same as the number of injection nozzles, and the slots being sickle-shaped, as can be seen from FIG. 2. The lengthwise bore 19 is permanently connected to each peripheral slot 20 via a drilling 21. At the level of the peripheral slots 20 control slots 22 are provided in the internal wall of the control cylinder, each leading to a peripheral groove 23 in the outer peripheral surface of the control cylinder 9. From each peripheral groove a passage 24 in the valve housing 11 emanates, leading to the first chamber 26 or 26′ of a constant-pressure valve. Each constant-pressure valve is flat-seated, and has two chambers 26 and 27 or 26′ and 27′ separated from each other by a diaphragm 25 or 25′. In the first chamber 26 or 26′ a valve opening 28 is provided, controlled by the diaphragm 25 or 25′, and connected by a passage 29 and a pipe 30 to an injection nozzle, shown schematically at 31.

The fuel is fed by a pump 32 via a differential pressure regulating valve 33 and a pipe 34 to a space 35, formed in a component 36 fitted to the cover 12. This space 35 is connected via a system pressure maintenance valve 37 to a return flow pipe 38, leading back to the fuel tank 40. The system pressure maintenance valve has a valve body 41, pressed by an adjustable spring 42 against a valve seat 43. By adjustment of spring pre-loading the level of the system pressure can be set to the desired value. From the space 35 the fuel flows on the one hand through a drilling 35*a* into the lengthwise drilling 19 of the control piston 8, and on the other hand into the damper chamber 16, from which it passes through the gap 44 between the hub 17*a* of the damper blade 17 and the cover 12 or the valve housing 11, and via a throttle drilling 45 into the second chamber 27 of the uppermost constant-pressure valve shown in FIG. 1. The second chambers 27 or 27′ of all the constant-pressure valves are connected via a system of passages 45*a*, 45*b*, 45*c*, to each other and via a pipe 46 to the differential pressure control valve 33, which maintains a set pressure in all chambers 27 and 27′.

Each of the constant-pressure valves comprises, as stated, two chambers 26 and 27 or 26′ and 27′, separated from each other by a diaphragm 25 or 25′. In the example shown, and in order to minimise the space occupied, the constant-pressure valves are arranged in two planes, and for this purpose the valve housing 11 of this example has on its side furthest from the inlet duct 1 a flat surface 48, in which there are two recesses forming the second chambers 27 of two constant-pressure valves. A block 49 is fitted to the flat surface 48, having recesses in its face 50 which abuts against the latter face 48, these recesses being positioned in line with the chambers 27 and forming the first chambers 26 of the constant-pressure valves. The diaphragm 25 is clamped between the faces 48 and 50, and can be common to all constant-pressure valves in this plane. Alternatively an individual diaphragm can be provided for each constant-pressure valve.

Figure 3:
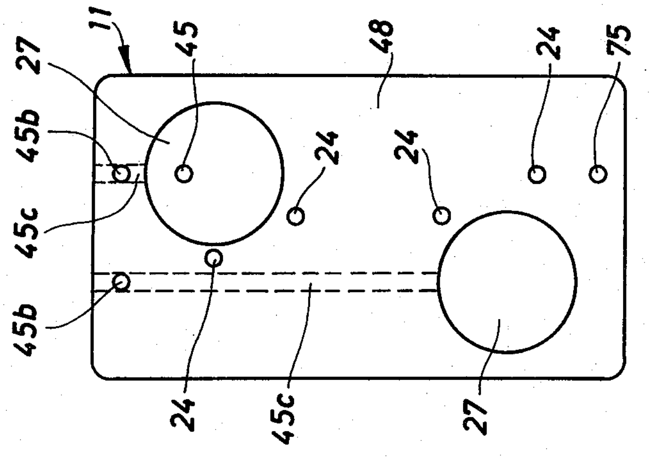
FIG. 3 is an end view of the flat surface of the control cylinder housing containing the second chambers of the constant pressure valves.
Figure 4:
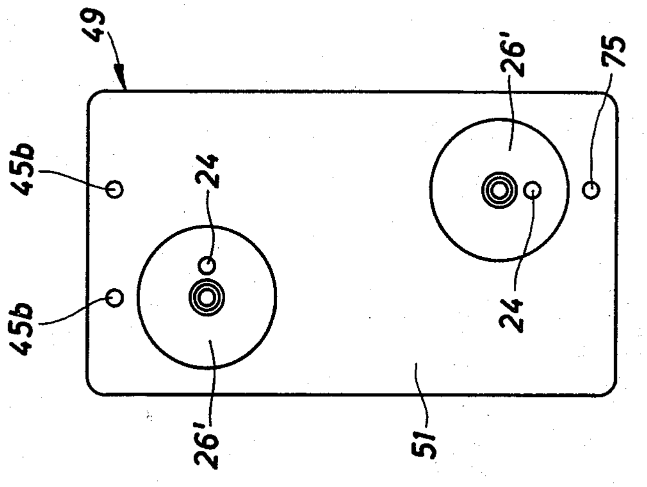
FIG. 4 is an end view of the component fitted to the flat surface of the control cylinder housing.

The block 49 has a further flat face 51 on the side furthest from the valve housing 11, and which in this example also has two recesses forming the first chambers 26′ of two additional constant-pressure valve, each connected by passages 24 to a control slot 22 in the control cylinder 9. A cover 52 is fitted on the face 51, its mating face 53 having recesses in line with the chambers 26′ in the face 51 and forming the second chambers 27′ of these constant-pressure valves. These chambers 27′ are connected by passages 45*a* and 45*b* to the pipe 46 leading to the differential pressure valve 33. For this purpose passages 45*b*, as can be seen from FIGS. 1 and 3, lead to drillings 45*c*, which lead from the second chambers 27 in the valve housing 11 to a connecting groove 55, formed in the mounting face of cover 12 and connected to the union for pipe 46. Between faces 51 and 53 the diaphragm 25′ is again clamped, separating the two chambers of the constant-pressure valves in this plane.

The thrust bearing of the control piston 8 and baffle flap 3 is simply a ball thrust bearing 60, fitted between the top of the control cylinder 9 and the lower end face of the hub 17*a* of the damper blade 17. This bearing can be simply manufactured by hardening the upper end face of the control cylinder 9 to form the lower bearing race, while the upper race is constituted by a hardened washer 61 supported on the hub 17*a* of the damper blade 17, balls being inserted between these hardened faces. The thickness of the washer 61 can at the same time be used to adjust the height of the damper blade 17.

Operation of the illustrated fuel injection system is as follows:

The baffle flap 3 is deflected in accordance with the quantity of air flowing through the inlet duct 1, thus causing the control piston 8 to turn, so that a larger or smaller cross-section of the sickle-shaped peripheral slots 20 is brought into line with the control slots 22, and a corresponding quantity of fuel flows through, proportional to the quantity of air drawn in. This fuel passes through the passages 24 into the first chambers 26, 26′ of the constant-pressure valves, and distorts the diaphragm(s) 25 in opposition to the pressure in the second chambers 27, 27′, the amount of distortion being determined by the differential pressure valve 33. Distortion of the diaphragm(s) 25 causes the valves 28 to open, and fuel can now flow through the passages 29 and pipes 30 to the injection nozzles 31. The constant-pressure valves ensure that the pressure drop across the control slots is constant, independent of the size of the free cross-section of the peripheral slots 20, so that the quantity of fuel injected by the nozzles 31 depends solely on the size of the free cross-section of the peripheral slots 20, being directly proportional to the deflection of the baffle flap 3, which in turn depends on the amount of air aspirated by the engine.

To adjust the quantity of fuel for idling the control cylinder 9 can be turned in relation to the control piston 8, so as to alter the position of the control edges **22*a* of the control slots 22 in relation to the peripheral slots 20. To do this, the cover 12, which is secured by a screw 65 to the valve housing 11 so as to turn with it, is rotated by a screw bolt 66 in relation to the control piston 8, after slackening the nuts 15. This bolt 66 has left- and right-handed threads 67, 68, at opposite ends, engaging in tapped holes 69, 70 in inserts secured to the inlet duct 1 and the cover 12** respectively.

To avoid the control piston 8 being pressed on one side against the control cylinder 9 due to the pressure acting on the baffle flap 3, there is in the control piston 8 a radial drilling 72 emanating from the lengthwise drilling 19 between two peripheral unloading grooves 73, 74. This radial drilling 72 is situated at an angle of roughly 90° to the lengthwise direction of the baffle flap 3, at or near the level of the centre of gravity S of the baffle flap, and extending towards the depression side of the baffle flap 3, as can be seen in FIG. 2. The unloading grooves 73, 74 are vented to the fuel tank via a passage 75 and a pipe 76. Thus the fuel pressure in the radial drilling can exert a force on the control piston 8 in opposition to that pressing the control piston 8 sideways against the control cylinder bore.

To vent the damper chamber 16, this is connected via a passage 78 with the drilling 79 which connects the space 35 with the system pressure maintenance valve 37.

In the example illustrated, the return force for the baffle flap 3 is generated by a coil spring 80, accommodated in the pot-shaped protrusion 5 of the baffle flap 3 inside the boss 4 of the inlet duct 1. The outer end of the spring is coupled by a pin 81 to the baffle flap 3, while its inner end is fixed to a hub 82, which can be turned in relation to the baffle flap 3 and locked by a nut 83, in order to adjust spring tension.

Figure 5:
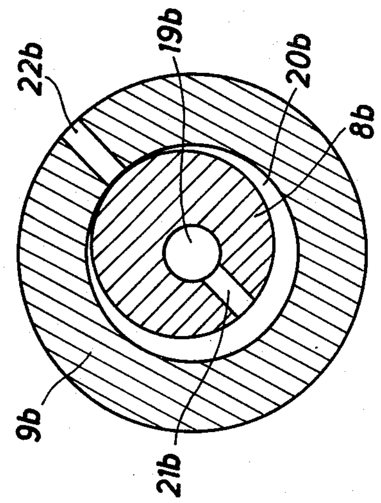
FIG. 5 is a cross-section through the control piston and control cylinder in a modified form of the invention.

In the arrangement as shown in FIG. 5, the peripheral slots **20*b* in the control piston 8*b* are formed by eccentric grooves, whose smallest cross-section is smaller than the effective cross-section of the peripheral slots in the idling position, while the cross-section of the control ports 22*b* in the control cylinder 9*b* is only slightly greater than the maximum groove cross-section. This allows complete compensation of the side-loading exerted on the control piston 8*b*** by the fuel pressure.

Figure 6:
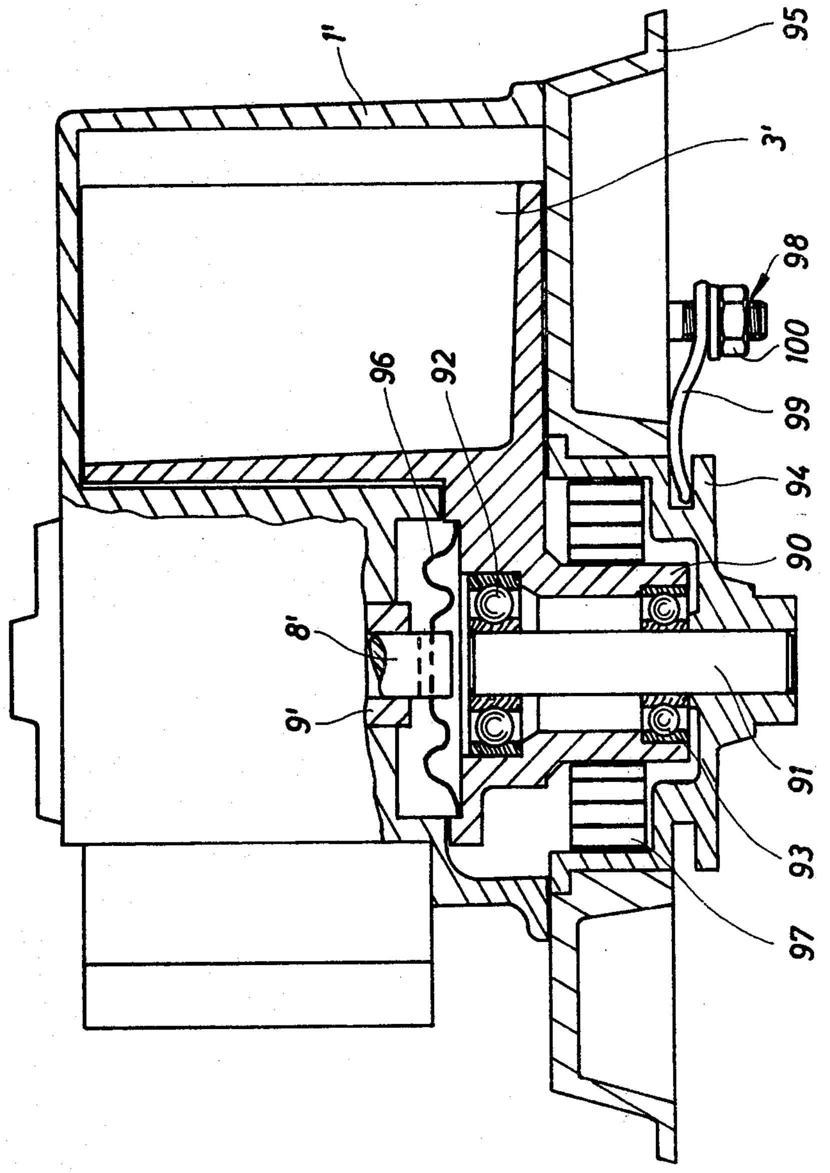
FIG. 6 is a side elevation partly in section of a variation of the unit shown in FIG. 1.

The essential difference between the arrangement shown in FIG. 6 from that of FIGS. 1 to 4, is merely that the baffle flap 3' is not directly fixed to the control piston 8' or supported via it in the control cylinder 9', but has a hub 90, turning on ball bearings 92 and 93 on a stationary spindle 91 coaxial with the control piston 8'. The spindle 91 fits in an insert 94, mounted in a cover 95 of the inlet duct housing 1'. The baffle flap 3' in this arrangement is connected to the control piston 8' by a coupling in the form of a driving spring 96 so as to turn with it and leave no free movement. The return force for the baffle flap 3' is again generated by a coil spring 97, fixed at its inner end to the hub 90 and at its outer one to the insert 94. The insert 94 can be turned to alter the spring tension, and can be secured in place by a clamping mechanism 98, comprising a clamping lever 99 and locknut 100.

Many variations of the typical arrangements shown are of course possible, without departing from the scope of the invention. The arrangement shown in FIGS. 1 to 4 is intended to supply four injection nozzles, and constant-pressure valves are provided. For a six-cylinder engine with six injection nozzles, six peripheral slots, six control slots, and six constant-pressure valves should accordingly be provided. Whereas in the example shown in each plane 48, 50, and 51, 53, there are only two constant-pressure valves, basically a larger number of constant-pressure valves can be accommodated in a single plane. It is for example entirely possible to accommodate four constant-pressure valves in one plane, so that for a four-cylinder engine with four injection nozzles the second plane 51, 53 is unnecessary.

Thus, the several aforenoted objects and advantages are most effectively attained. Although several somewhat preferred embodiments have been disclosed and described in detail herein, it should be understood that this invention is in no sense limited thereby and its scope is to be determined by that of the appended claims.

What we claim is:

1. A fuel injection system for a mixture-compressing internal-combustion engine with separate ignition and continuous fuel injection into the inlet duct, which incorporates an adjustable throttle butterfly valve and a baffle flap pivotally mounted at the side of the inlet duct to move in accordance with the air flow rate acting in opposition to a return force, the baffle flap being coupled to a damper blade and to a coaxial rotary control member of a fuel metering valve, comprising a control cylinder containing a relatively rotatable control piston arranged to meter the quantity of fuel delivered to one or more injection nozzles in proportion to the air flow rate, the control cylinder being stationary and mounted alongside the baffle flap outside the inlet duct, and the rotary control piston being connected outside the control cylinder adjacent one end to the baffle flap, and adjacent the other end to the damper blade, so as to rotate with the flap and the blade.

2. A fuel injection system according to claim 1, in which the wall of the inlet duct near the baffle flap has a lateral boss accommodating one end of the control cylinder, and into which a projection of the baffle flap extends, being secured to one end of the control piston so as to rotate therewith.

3. A fuel injection system according to claim 1, in which the control piston has peripheral slots, one for each injection nozzle, connected to a central lengthwise bore, and the control cylinder has control ports cooperating with these peripheral slots, and each connected to an injection nozzle via passages in a housing enclosing and fixed to the control cylinder, and constant-pressure valves.

4. A fuel injection system according to claim 3, in which each constant-pressure valve is flat-seated, with a diaphragm separating two chambers and a valve port in one of the chambers controlled by the diaphragm, the housing having on its side furthest from the baffle flap a flat face parallel with the axis of rotation of the control piston and containing one or more recesses each forming the second chamber of a constant-pressure valve, and being covered by a diaphragm, a component being fitted to the said flat face, having in its face adjacent this said flat face one or more recesses each forming the first chamber of one of the said constant-pressure valves, and being connected to one of the passages and to an injection nozzle, while the second chamber is supplied with fuel at controlled pressure.

5. A fuel injection system according to claim 4, in which the said component has on its side furthest from the housing a second flat face with recesses forming the chambers of constant-pressure valves covered by diaphragms, and a cover is fitted over this flat face having corresponding recesses forming the second chambers of constant-pressure valves.

6. A fuel injection system according to claim 1, in which the control cylinder can be rotated in relation to the control piston to adjust the idling setting.

7. A fuel injection system according to claim 3, in which there is a radial bore in the control piston emanating from the lengthwise bore between two unloading grooves and at an angle of roughly 90° to the lengthwise direction of the baffle flap at or near the level of the baffle flap centre of gravity, and extending towards the depression side of the baffle flap.

8. A fuel injection system according to claim 3, in which the peripheral slots in the control piston are formed by eccentric peripheral grooves, whose smallest cross-section is smaller than the effective cross-section in the idling position, and the cross-section of each control port in the control cylinder is only slightly greater than the largest groove cross-section.

9. A fuel injection system according to claim 4, in which the control cylinder with the control piston is mounted substantially vertically, and at its top end a damper chamber is mounted, accommodating the damper blade and connected to a fuel feed pipe, discharging into a space above the damper chamber, the latter being connected both to the lengthwise bore in the control piston and to the second chambers of the constant-pressure valves.

10. A fuel injection system according to claim 9, in which a ball thrust bearing is fitted between the top end of the control cylinder and a shoulder on the control piston.

11. A fuel injection system according to claim 10, in which the top end face of the control cylinder is hardened and forms the bottom race of the ball thrust bearing, and the upper race is formed by a hardened washer, supported on the hub of the damper blade fitted to the control piston, and simultaneously determining the height setting of the damper blade.

12. A fuel injection system according to claim 9, in which the fuel is supplied by a pump via a system pressure control valve fitted to the damper chamber, and a return flow pipe is connected via the system pressure control valve to the damper chamber.

13. A fuel injection system according to claim 4, in which unions for the second chambers of the constant-pressure valves are situated above the chambers.

* * * * *